US007420621B2

(12) United States Patent  (10) Patent No.: US 7,420,621 B2
Tsukamoto et al.  (45) Date of Patent: Sep. 2, 2008

(54) VIDEO AND AUDIO SIGNAL OUTPUT DEVICE

(75) Inventors: Keisuke Tsukamoto, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 567 days.

(21) Appl. No.: 11/132,187

(22) Filed: May 19, 2005

(65) Prior Publication Data
US 2005/0275757 A1  Dec. 15, 2005

(30) Foreign Application Priority Data
May 19, 2004  (JP)  .............................. 2004-148575

(51) Int. Cl.
*H04N 5/445*  (2006.01)
(52) U.S. Cl. ..................................... 348/569
(58) Field of Classification Search ................ 348/569, 348/563–565, 567, 553, 552
See application file for complete search history.

(56) References Cited

U.S. PATENT DOCUMENTS

| 5,428,400 | A | * | 6/1995 | Landis et al. ................ 348/569 |
| 6,317,882 | B1 | * | 11/2001 | Robbins ........................ 725/34 |
| 6,721,015 | B2 | * | 4/2004 | Yuen et al. .................... 348/460 |
| 6,766,528 | B1 | * | 7/2004 | Kim et al. ..................... 725/113 |
| 6,901,207 | B1 | * | 5/2005 | Watkins ......................... 386/83 |
| 6,985,189 | B1 | * | 1/2006 | Takada et al. ................ 348/558 |
| 6,992,728 | B2 | * | 1/2006 | Takagi et al. ................ 348/569 |
| 7,068,323 | B2 | * | 6/2006 | Lee et al. ..................... 348/569 |

FOREIGN PATENT DOCUMENTS

| JP | 64-68097 A | 3/1989 |
| JP | 03-066089 | 3/1991 |
| JP | 04-172881 | 6/1992 |
| JP | 5-244662 A | 9/1993 |
| JP | 8-98096 A | 4/1996 |
| JP | 10-31541 A | 2/1998 |
| JP | 11-232853 | 8/1999 |
| JP | 411232853 A | * 8/1999 |
| JP | 2002-34087 A | 1/2002 |
| JP | 2003-69700 A | 3/2003 |

* cited by examiner

*Primary Examiner*—Paulos M Natnael
(74) *Attorney, Agent, or Firm*—Crowell & Moring LLP

(57) ABSTRACT

When a user commands a microprocessor, using a remote control, to output information about a video and audio signal output device itself to a monitor device, the microprocessor superimposes, on video signals decoded by a decoder, video signals of a terminal connection information image for displaying, on the monitor device, color images corresponding to output signals from respective output terminals of red (R), green (G) and blue (B) in a VGA terminal or a BNC terminal so as to form and output combined video signals to the monitor device. Thus, e.g. if the monitor device has multiple video signal input terminals for inputting output signals from the respective output terminals of R, G and B, and if no signal is input from one of the input terminals, the user can confirm the input terminal, from which no signal is input, by just watching the screen of the monitor device without confirming the actual connection of the input terminals.

6 Claims, 7 Drawing Sheets

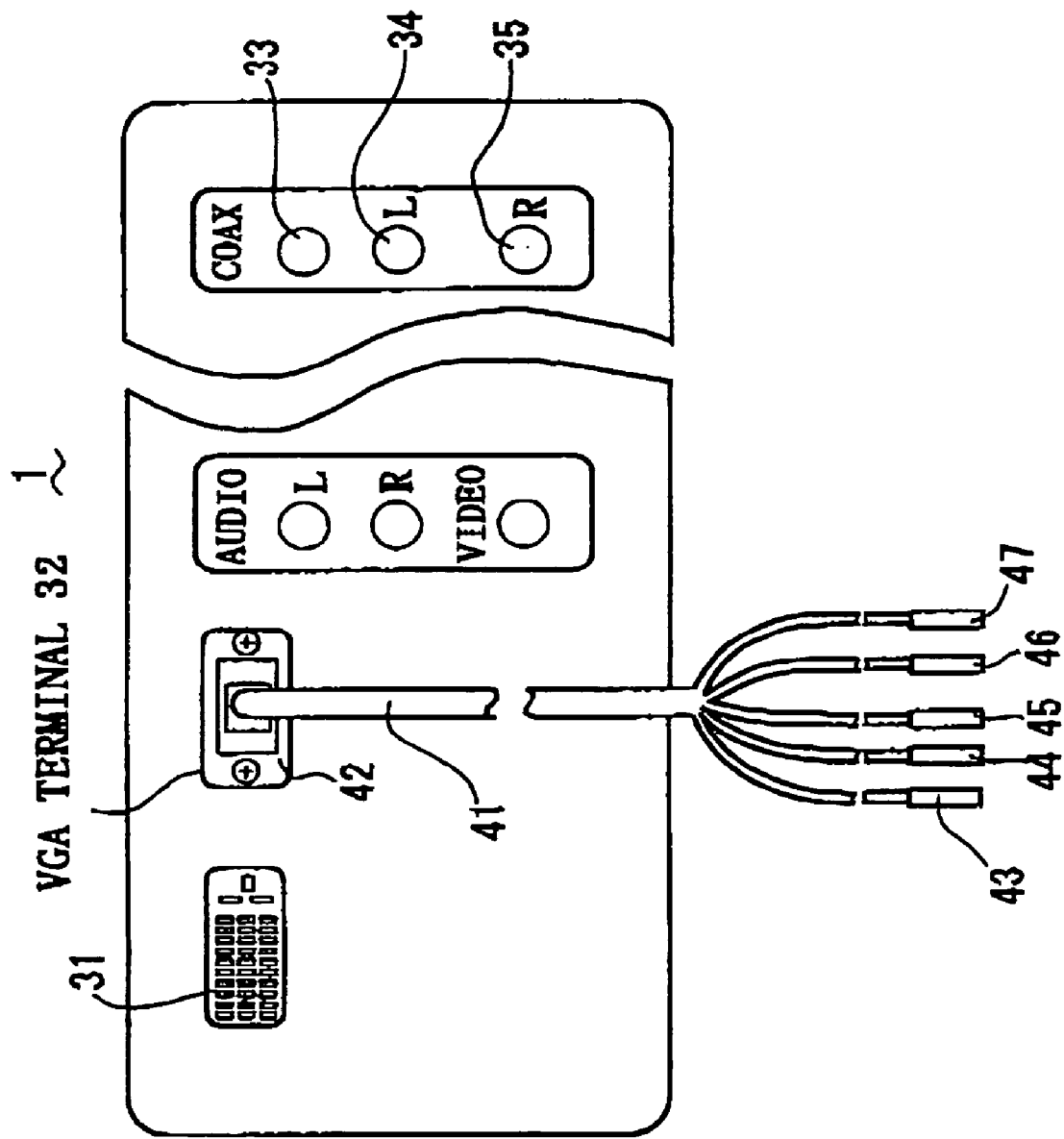

VIDEO AND AUDIO SIGNAL OUTPUT DEVICE

BACKGROUND OF THE INVENTION

1. Field of the Invention

The present invention relates to a video and audio signal output device, such as a digital TV (Television) broadcast signal receiver or a DVD (Digital Versatile Disc) recorder, for outputting video signals and audio signals to a display device such as a liquid crystal display.

2. Description of the Related Art

An AV (Audio Visual) system including a video and audio signal output device is known, which has a function to display, on a screen of a display device, information about the video and audio signal output device in the system, and a function to display, on the screen, a message for prompting a user to confirm connection of the device when the system finds no video and audio input signals by detecting presence or absence of input signals from respective input terminals (for example, refer to Japanese Laid-open patent publication Hei 4-172881). Further, Japanese Laid-open patent publication Hei 11-232853 discloses an AV system having a function to display, on a display device in the system by OSD (On Screen Display), a name of a video and audio signal output device currently sending signals to the display device. Furthermore, Japanese Laid-open patent publication Hei 3-66089 discloses such an AV system, including a television and a video device, that detects wrong connection between the television and the video device so as to emit a warning sound from a speaker of the television, and to display characters of "Wrong Connection" on a CRT (Cathode Ray Tube) of the television by OSD.

However, the technologies disclosed in these patent publications have the following problems. The technology disclosed in the above Japanese Laid-open patent publication Hei 4-172881 is not able to inform a user of a video and audio signal output device currently sending signals to the display device. Further, if the display device has multiple video signal input terminals or audio signal input terminals in use, and if no signal is input from one or ones of the input terminals, the technology disclosed therein is not able to inform the user of the one or ones of the input terminals from which no signal is input. On the other hand, the technology disclosed in Japanese Laid-open patent publication Hei 11-232853 is able to immediately inform a user of a name of a video and audio signal output device currently sending signals to the display device, if the video and audio signal output device and the display device are placed in the same room in which the user is located. However, if the video and audio signal output device and the display device are respectively placed in separate rooms, and if the user is located in the room in which the video and audio signal output device is placed, the technology disclosed therein is not able to immediately inform the user of the name of the video and audio signal output device currently sending signals to the display device. Besides, the technology disclosed in Japanese Laid-open patent publication Hei 3-66089 cannot solve such problems.

SUMMARY OF THE INVENTION

An object of the present invention is to provide a video and audio signal output device such that it can immediately inform a user of information, such as name, about the video and audio signal output device currently sending signals to a display device even if the video and audio signal output device and the display device are respectively placed in separate rooms, and even if the user is located in the room in which the video and audio signal output device is placed, and/or such that if the display device has multiple video signal input terminals or audio signal input terminals in use, and if no signal is input from one or ones of the input terminals, it can inform the user of the one or ones of the input terminals from which no signal is input.

According to a first aspect of the present invention, we provide a video and audio signal output device comprising: a decoder for decoding video signals and audio signals; a storage device for storing audio signals of information about the video and audio signal output device itself; a microprocessor for controlling the video and audio signal output device in its entirety; an operation unit to be used by a user for giving various commands to the microprocessor; a video signal output terminal for outputting the video signals decoded by the decoder, and an audio signal output terminal for outputting the audio signals decoded by the decoder.

The video and audio signal output device is connected to a display device including a speaker. When the user commands the microprocessor, using the operation unit, to output the information about the video and audio signal output device itself to the display device, the microprocessor outputs the audio signals of the information about the video and audio signal output device itself, stored in the storage device, to the speaker of the display device via the audio signal output terminal.

This video and audio signal output device makes it possible to inform the user, by using e.g. voice, of e.g. a name of the video and audio signal output device itself currently sending signals to the display device. Accordingly, even if the video and audio signal output device and the display device are respectively placed in separate rooms, and even if the user is located in the room in which the video and audio signal output device is placed, the video and audio signal output device can immediately inform the user of e.g. the name of the video and audio signal output device itself currently sending signals to the display device.

According to a second aspect of the present invention, we provide a video and audio signal output device comprising: a decoder for decoding video signals and audio signals; a storage device for storing video signals of a display image of information about the video and audio signal output device itself; an on-screen display unit (hereafter referred to simply as "OSD unit") for superimposing the video signals of the display image of the information about the video and audio signal output device itself, stored in the storage device, on the video signals decoded by the decoder so as to form combined video signals; a microprocessor for controlling the video and audio signal output device in its entirety; an operation unit to be used by a user for giving various commands to the microprocessor; a video signal output terminal for outputting the video signals decoded by the decoder or outputting the combined video signals including the video signals superimposed by the OSD unit; and an audio signal output terminal for outputting the audio signals decoded by the decoder.

The video and audio signal output device is connected to a display device. The video signal output terminal is a VGA (Video Graphics Array) terminal or a BNC (Bayonet Neill Concelman) terminal each having output terminals of red (R), green (G) and blue (B). The display image of the information about the video and audio signal output device itself contains a terminal connection information image for displaying, on the display device, color images corresponding to output signals from the respective output terminals of red (R), green (G) and blue (B) in the VGA terminal or the BNC terminal. When the user commands the microprocessor, using the operation unit, to output the information about the video and audio signal output device itself to the display device, the microprocessor outputs the combined video signals, including the video signals superimposed by the OSD unit, to the display device via the video signal output terminal.

In the video and audio signal output device according to the second aspect of the present invention, when the user gives a command, by using the operation unit, to output the information about the video and audio signal output device itself to the display device, then the video signals of the terminal connection information image for displaying, on the display device, the color images corresponding to the output signals from the respective output terminals of red (R), green (G) and blue (B) in the VGA terminal or the BNC terminal are superimposed on the video signals, decoded by the decoder, into the combined video signals which are output to the display device. Thus, e.g. if the display device has multiple video signal input terminals for inputting output signals from the respective output terminals of R, G and B, and if no signal is input from one or ones of the input terminals, the user can confirm the one or ones of the input terminals, from which no signal is input, by just watching the screen of the monitor device without confirming the actual connection of the input terminals.

It can also be designed such that the display device includes a left speaker and a right speaker, wherein the video and audio signal output device comprises a left audio signal output terminal for outputting audio signals to the left speaker of the display device, and a right audio signal output terminal for outputting audio signals to the right speaker of the display device, wherein the storage device further stores an audio signal of left notification voice to be output to the left audio signal output terminal and an audio signal of right notification voice to be output to the right audio signal output terminal, and wherein when the user commands the microprocessor, using the operation unit, to output the information about the video and audio signal output device itself to the display device, the microprocessor not only outputs the combined video signals, including the video signals superimposed by the OSD unit, to the display device via the video signal output terminal, but also outputs the audio signal of left notification voice, stored in the storage device, to the left speaker of the display device via the left audio signal output terminal, and further outputs the audio signal of right notification voice, stored in the storage device, to the right speaker of the display device via the right audio signal output terminal.

An advantage of this design is as follows. Assuming that no signal is input from one of the left and right audio signal input terminals of the display device respectively corresponding to the left and right audio signal output terminals of the video and audio signal output device, and also assuming that e.g. a voice "Left" and a voice "Right" are used for the left notification voice and the right notification voice, respectively, it is possible for the user to easily confirm which of the audio signal input terminals of the display device has no signal input thereto, by just listening the voice without confirming the actual connection of the audio signal input terminals.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2 is a schematic rear view of the video and audio signal output device, showing respective terminals provided on the back of the device;

FIG. 6 is a schematic view of a video and audio signal output device wirelessly connected to two monitor devices for explaining how to immediately inform the user, located near the video and audio signal output device, that the video and audio signal output device currently sends signals to one of the monitor devices, and for explaining how to immediately inform the user of which one of the monitor devices the video and audio signal output device currently sends signals to.

DESCRIPTION OF THE PREFERRED EMBODIMENTS

Figure 1:
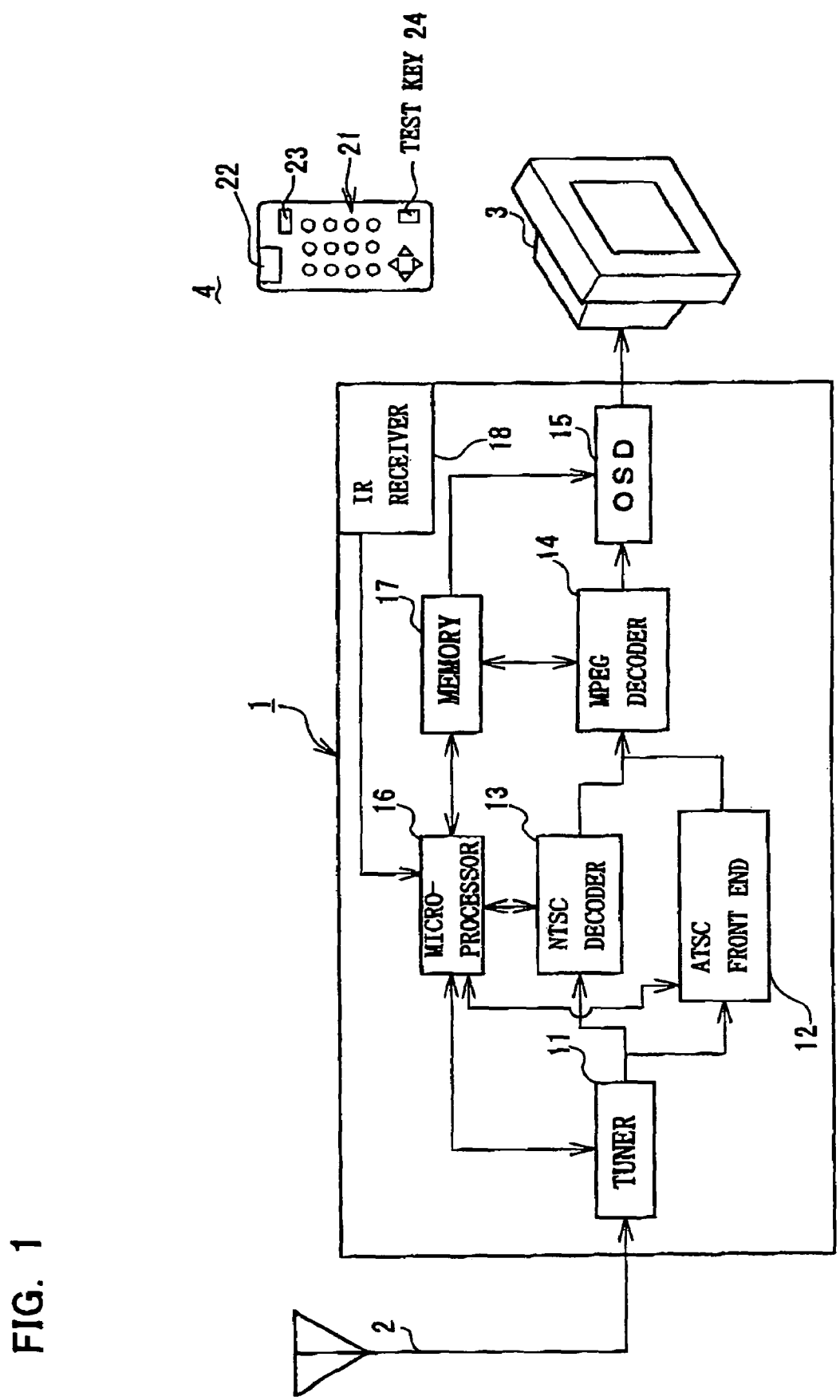
FIG. 1 is a schematic block diagram of a video and audio signal output device according to a first embodiment of the present invention.

The best modes and preferred embodiments of the present invention will be described hereinafter with reference to the annexed drawings. The present invention relates to a video and audio signal output device, such as a digital TV (Television) broadcast signal receiver or a DVD (Digital Versatile Disc) recorder, which outputs video signals and audio signals to a display device such as a liquid crystal display, and which can immediately inform a user of information, such as name, about the video and audio signal output device currently sending signals to a display device even if the video and audio signal output device and the display device are respectively placed in separate rooms, and even if the user is located in the room in which the video and audio signal output device is placed. Note that the specific embodiments described are not intended to cover the entire scope of the present invention, and hence the present invention is not limited to only the specific embodiments. Before the description of the embodiments of the present invention, it is to be noted that like parts are designated by like reference numerals throughout the drawings.

FIG. 1 shows a schematic block diagram of a video and audio signal output device according to a first embodiment of the present invention. The first embodiment shows an example where the video and audio signal output device according to the present invention is a digital TV broadcast signal receiver. The digital TV broadcast signal receiver (hereafter referred to simply as "receiver") 1 corresponds to a video and audio signal output device according to any one of claims 1 to 4 and claim 6.

The receiver 1 is connected to an antenna 2, and comprises: a tuner 11 for receiving TV broadcast signals; an ATSC (Advanced Television Systems Committee) front end 12 for subjecting digital TV broadcast signals received by the tuner 11 to predetermined signal processing for demodulating it; an NTSC (National Television System Committee) decoder 13 for demodulating analog TV broadcast signals received by the tuner 11 and converting the analog TV broadcast signals into digital TV broadcast signals; an MPEG (Motion Picture Experts Group) decoder 14 for decoding MPEG-compressed TV broadcast signals so as to reproduce video signals and audio signals; an on-screen display unit (hereafter referred to simply as "OSD unit") 15 for superimposing video signals of a display image, displaying e.g. information about the receiver 1 itself, on the video signals decoded by the MPEG decoder 14; a microprocessor 16 for controlling respective elements in the receiver 1 including the ATSC front end 12 and the NTSC decoder 13; a memory (storage device) 17 for temporarily storing the video signals and audio signals decoded by the MPEG decoder 14 and for storing the video signals of the display image displaying the information about the receiver 1 itself as well as storing audio signals indicating a name or device name of the receiver 1 itself, and so on.

The display image displaying the information about the receiver 1 itself contains a device information image indicating the device name of the receiver 1 itself and also contains a terminal connection information image for directly displaying, on a monitor device (display device) 3, color images corresponding to output signals from respective output terminals of red (R), green (G) and blue (B) in a VGA (Video Graphics Array) terminal described later (refer to FIG. 2) which is a video signal output terminal. Furthermore, the receiver 1 comprises an infrared signal receiving unit (IR receiver) 18 for receiving infrared signals from a remote controller (hereafter referred to as "remote control") (operation unit) 4.

The remote control 4 is used by a user to give various commands to the microprocessor 16 of the main body of the receiver 1, and has an infrared signal transmitting unit 22 and a key unit 21 having various keys. Provided as the keys of the key unit 21 are a power supply key 23, numeric input keys and a cursor movement keys as well as a test key 24. The test key 24 is used by the user to command the OSD unit 15 to superimpose the video signals of the display image, displaying the information about the receiver 1 itself and recorded in the memory 17, on the video signals decoded by the MPEG decoder 14.

The video signals decoded by the MPEG decoder 14 are output to the monitor device 3 via the OSD unit 15, while the audio signals decoded by the MPEG decoder 14 are output to a speaker or speakers of the monitor unit 3. Note that the MPEG decoder 14 functions mainly as claimed decoder. Further note that although the receiver 1 at the user site can send data to broadcast stations in digital TV broadcasting, description thereof is omitted herein because it does not directly relate to the present invention.

Referring to FIG. 2, respective terminals provided on the back of the receiver 1 will be described in the following. Provided on the back of the receiver 1 are: a DVI (Digital Visual Interface) terminal 31 for outputting video signals in digital format to the monitor device 3; a VGA terminal 32 which is a common video signal output terminal for connecting a computer to a display; a coaxial digital audio signal output terminal 33; a left analog audio signal output terminal 34; a right analog audio signal output terminal 35; and the like. The VGA terminal 32 is composed of 15 output terminals which are assigned to analog RGB signal, horizontal synchronizing signal, vertical synchronizing signal and ground.

A cable 41 is used to connect the VGA terminal 32 to video signal input terminals of the monitor device 3. At an end of the cable 41 to be connected to the VGA terminal 32, the cable 41 has a connector unit 42 of D-Sub 15-pin having 3 rows of 5 pins each. On the other hand, the cable 41 at the other end to be connected to the monitor 3 is furcated into a red (R) signal output connector 43, a green (G) signal output connector 44, a blue (B) signal output connector 45, a black signal output connector 46 and a white signal output connector 47.

The following describes the display image which displays information about the receiver 1 itself and which is output from the receiver 1 to the monitor device 3. When a user presses the test key 24 of the remote control 4 to command the microprocessor 16, to output information about the receiver 1 itself to the monitor device 3 while the receiver 1 outputs video signals and audio signals to the monitor device 3, the microprocessor 16 of the receiver 1 outputs audio signals indicating the device name of the receiver 1 itself stored in the memory 17 to the speaker or speakers (refer to those designated by reference numerals 61 and 62 in FIG. 5) of the monitor device 3 via the left analog audio signal output terminal 34 and the right analog audio signal output terminal 35. At the same time, the microprocessor 16 of the receiver 1 superimposes, on the video signals decoded by the MPEG decoder 14, video signals of a connection information image 51 (claimed display image of information about the video and audio signal output device itself) formed of a device information image 52, indicating the device name of the receiver 1 itself, and a terminal connection information image 53 as shown in FIG. 3A and FIGS. 4A, 4B, 4C and 4D so as to form combined video signals, and further outputs the thus combined video signals to the monitor device 3. The terminal connection information image 53 is an image for directly displaying, on the monitor device 3, output signals from respective output terminals of R, G and B in the VGA terminal 32 of the receiver 1.

Figure 3A:
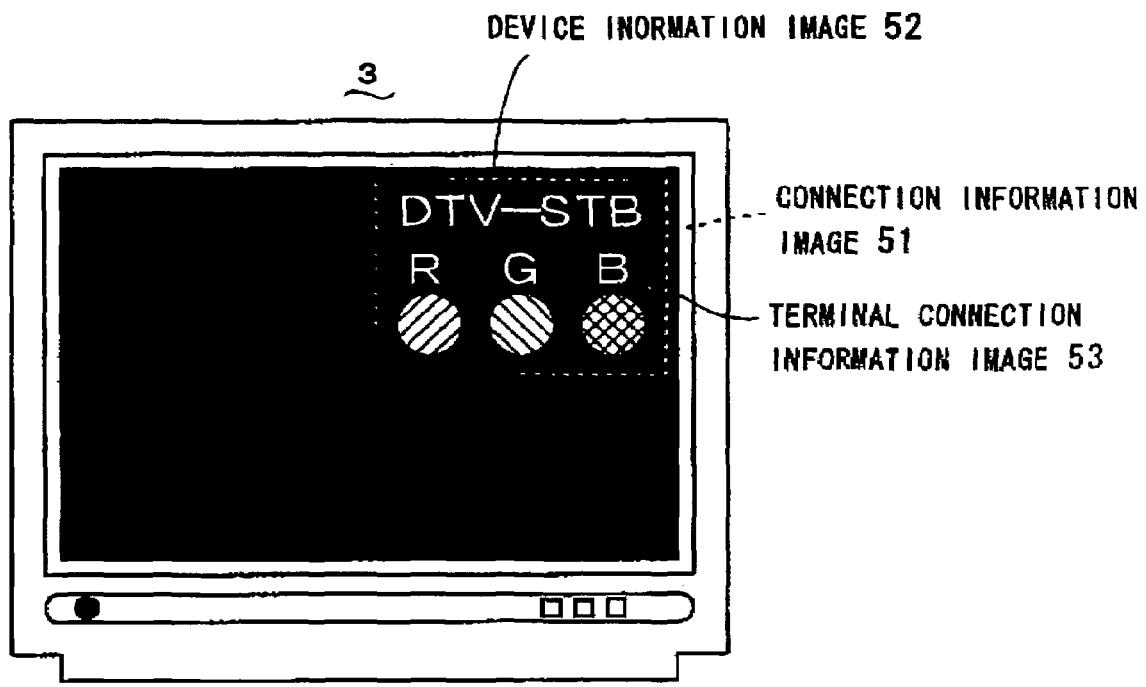
FIG. 3A is a schematic view showing an example of a connection information image (display image of information about the video and audio signal output device itself)
Figure 3B:
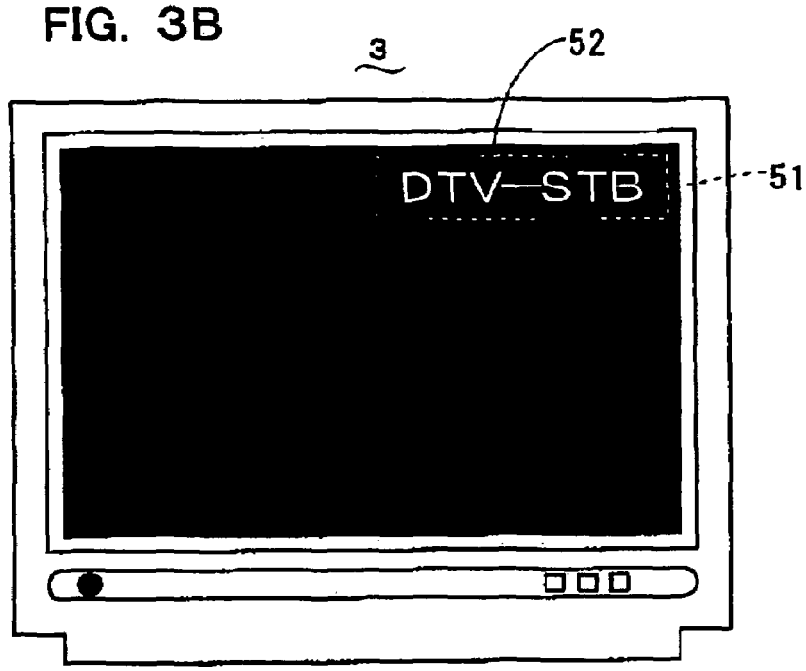
FIG. 3B is a schematic view showing another example of a connection information image.

Alternatively, it is possible to change the content of the connection information image 51 depending on the detection by the microprocessor 16 of the receiver 1 as to whether or not the receiver 1 itself is connected to the monitor device 3 via the VGA terminal 32. More specifically, it is possible that (a) when the microprocessor 16 of the receiver 1 detects that the receiver 1 itself is connected to the monitor device 3 via the VGA terminal 32, the microprocessor 16 of the receiver 1 superimposes, on the video signals decoded by the MPEG decoder 14, video signals of the connection information image 51 formed of the device information image 52 and the terminal connection information image 53 as shown in FIG. 3A and FIGS. 4A, 4B, 4C and 4D so as to form combined video signals, and further outputs the thus combined video signals to the monitor device 3, while (b) when the microprocessor 16 of the receiver 1 detects that the receiver 1 itself is connected to the monitor device 3 via another terminal (an output terminal other than the VGA terminal 32), the microprocessor 16 of the receiver 1 superimposes, on the video signals decoded by the MPEG decoder 14, video signals of a connection information image 51 formed only of a device information image 52 as shown in FIG. 3B so as to form combined video signals, and further outputs the thus combined video signals to the monitor device 3.

The following method can be used to detect whether the receiver 1 itself is connected to the monitor device 3 via the VGA terminal 32 or another terminal. That is, the receiver 1 is designed to have a switch to be operated by a user for identifying the kind of the video signal output terminal currently being in use. When the receiver 1 is connected to the monitor device 3 via the VGA terminal 32, the user turns the switch on, while the user turns the switch off when the receiver 1 is connected to the monitor device 3 via another terminal such as a component signal output terminal for outputting signals Y (luminance signal), $P_B$ (blue color difference signal) and $P_R$ (red color difference signal). Thereby, the microprocessor 1 of the receiver 1 can easily detect, according to on/off of signals input thereto via the switch, whether the receiver 1 itself is connected to the monitor device 3 via the VGA terminal 32 or another terminal.

Figure 4A:
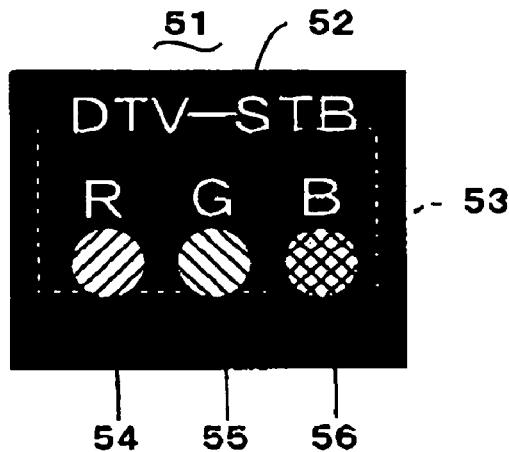
FIG. 4A is a schematic view showing an example of a connection information image in normal connection mode of a cable.

Referring now to FIGS. 4A, 4B, 4C and 4D, the connection information image 51 will be described in the case where the receiver 1 is connected to the monitor device 3 via the VGA terminal 32. In an R image 54, a G image 55 and a B image 56 in the terminal connection information image 53, respective color images are displayed corresponding to respective input signals from the R signal output connector 43, the G signal output connector 44 and the B signal output connector 45 shown in FIG. 2. Thus, if the connector unit 42 of the cable 41 is normally connected to the VGA terminal 32 of the receiver 1, and if the connectors 43, 44 and 45 of the cable 41 are normally connected to respective R, G and G video signal input terminals of the monitor device 3, and further if the cable 41 is not broken, then the R image 54, the G image 55 and the B image 55 are displayed in the terminal connection information image 53 on a screen of the monitor device 3, displaying red color, green color and blue color, respectively, as shown in FIG. 4A. Thus, it can be said that FIG. 4A shows a connection information image 51 in the normal connection mode of the cable 41.

Figure 4B:
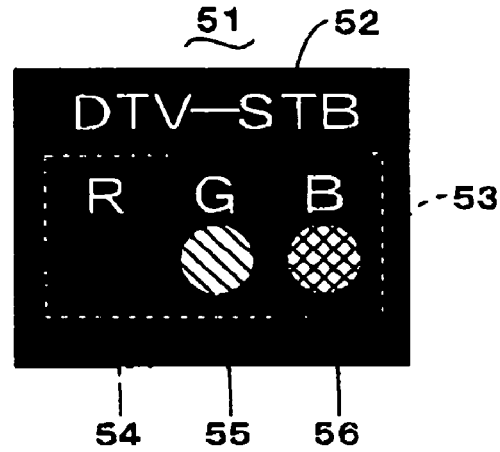
FIG. 4B is a schematic view showing an example of a connection information image when the cable is broken for transmitting R signals.
Figure 4C:
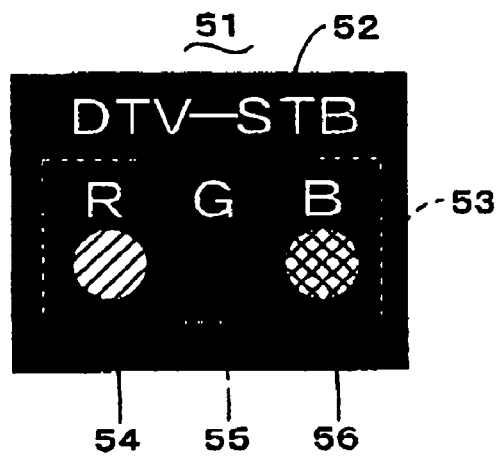
FIG. 4C is a schematic view showing an example of a connection information image when the cable is broken for transmitting G signals.
Figure 4D:
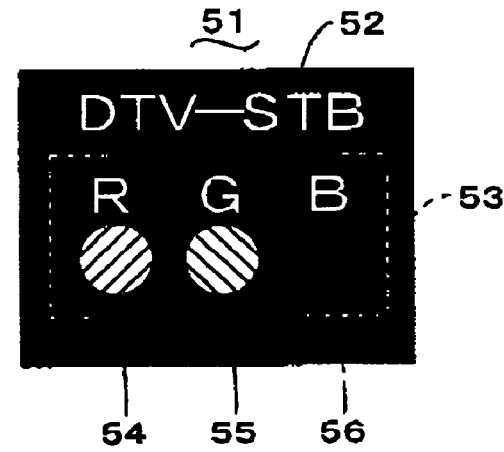
FIG. 4D is a schematic view showing an example of a connection information image when the cable is broken for transmitting B signals.

On the other hand, if the connector 43 of the cable 41 is not connected to the R video signal input terminal of the monitor device 3, and/or if a portion of the cable 41 for transmitting R signals is broken, then the R image 54 is not displayed in the terminal connection information image 53 on the screen of the monitor device 3, thereby displaying only the G image 55 and the B image 56 as shown in FIG. 4B. If the connector 44 of the cable 41 is not connected to the G video signal input terminal of the monitor device 3, and/or if a portion of the cable 41 for transmitting G signals is broken, then the G image 55 is not displayed in the terminal connection information image 53 on the screen of the monitor device 3, thereby displaying only the R image 54 and the B image 56 as shown in FIG. 4C. Furthermore, if the connector 45 of the cable 41 is not connected to the B video signal input terminal of the monitor device 3, and/or if a portion of the cable 41 for transmitting B signals is broken, then the B image 56 is not displayed in the terminal connection information image 53 on the screen of the monitor device 3, thereby displaying only the R image 54 and the G image 55 as shown in FIG. 4D. Thus, it can be said that FIGS. 4B, 4C and 4D each show a connection information image 51 when the cable 41 is not normally connected to the video signal input terminal(s) of the monitor device 3, or when the cable 41 is broken for transmitting the R signals, the G signals and the B signals, respectively.

As described above, the images 54, 55 and 56 corresponding to the R, G and B input signals are displayed in the connection information image 51. Accordingly, when no signal is input to the monitor device 3 from one of the input terminals of the monitor device 3 in the case where the receiver 1 is connected to the monitor device 3 via the VGA terminal 32, a user can confirm or identify the one of the input terminals of the monitor device 3, from which no signal is input, by just watching the screen of the monitor device 3 without confirming or watching the actual connection of the connectors 43 to 45 connected the input terminals of the monitor device 3. Although the above example shows the case where no signal is input to the monitor device 3 from one of the input terminals of the monitor device 3, it is evident from the above example that in a similar manner the user can confirm or identify multiple ones of the input terminals of the monitor device 3 from which no signal is input, when no signal is input to the monitor device 3 from the multiple ones of the input terminals of the monitor device 3.

Figure 5:
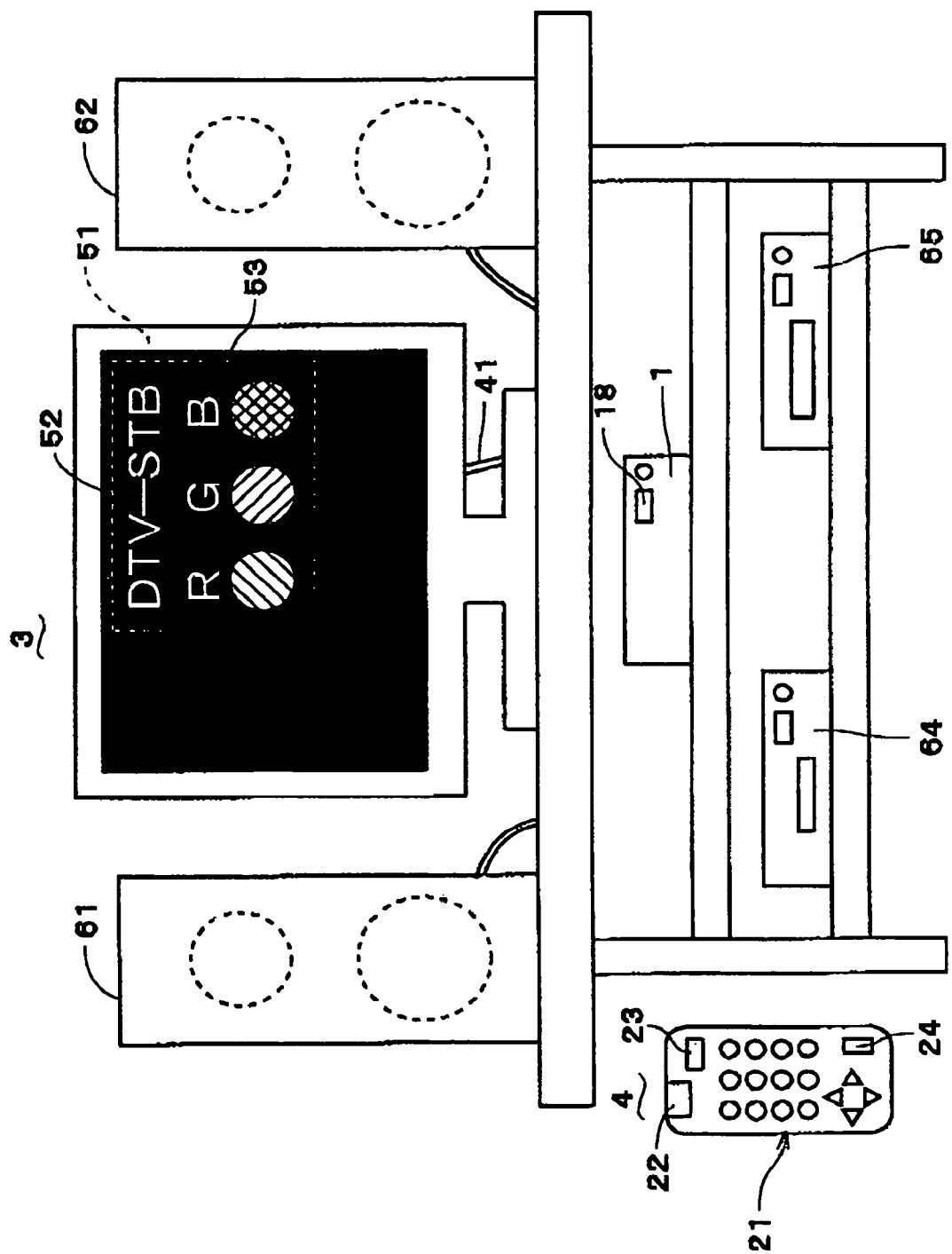
FIG. 5 is a schematic view of three kinds of video and audio signal output devices connected to a monitor device for explaining a way for a user to confirm which one of the video and audio signal output devices currently outputs video signals to the monitor device.

In addition to the function of displaying the device information image 52, the receiver 1 has a function of outputting sounds from the speaker (claimed left speaker) 61 and the speaker 62 (claimed right speaker) in a manner that when a user presses the test key 24 of the remote control 4, the receiver 1 outputs to the monitor device 3 the video signals of the device information image 52 indicating the device name of the receiver 1 itself, and the audio signals also indicating the device name of the receiver 1 itself. More specifically, assume as shown in FIG. 5 that three kinds of video and audio signal output devices (receiver 1, DVD video recorder 64 and further digital video recorder 65) are connected to the monitor device 3. A user would not be able to confirm or identify which one of the three video and audio signal output devices currently outputs video signals to the monitor device 3 if the receiver 1 did not have the above functions.

However, owing to the functions of the receiver 1, if the user presses the test key 24 of the remote control 4 of the receiver 1 when the receiver 1 outputs video signals to the monitor device 3, then at least the device information image 52 indicating the device name of the receiver 1 is output to the monitor device 3, and the audio signals indicating the device name of the receiver 1 are output to the speakers 61 and 62 of the monitor device 3, whereby the functions of the receiver 1 produce an effect that the user can confirm or identify that the receiver 1 itself currently outputs video signals to the monitor device 3. By allowing each of the DVD video recorder 64 and the further digital video recorder 65 to have functions similar to those of the receiver 1, it is possible that the user can confirm or identify which one of the video and audio signal output devices currently outputs video signals to the monitor device 3.

Figure 6:
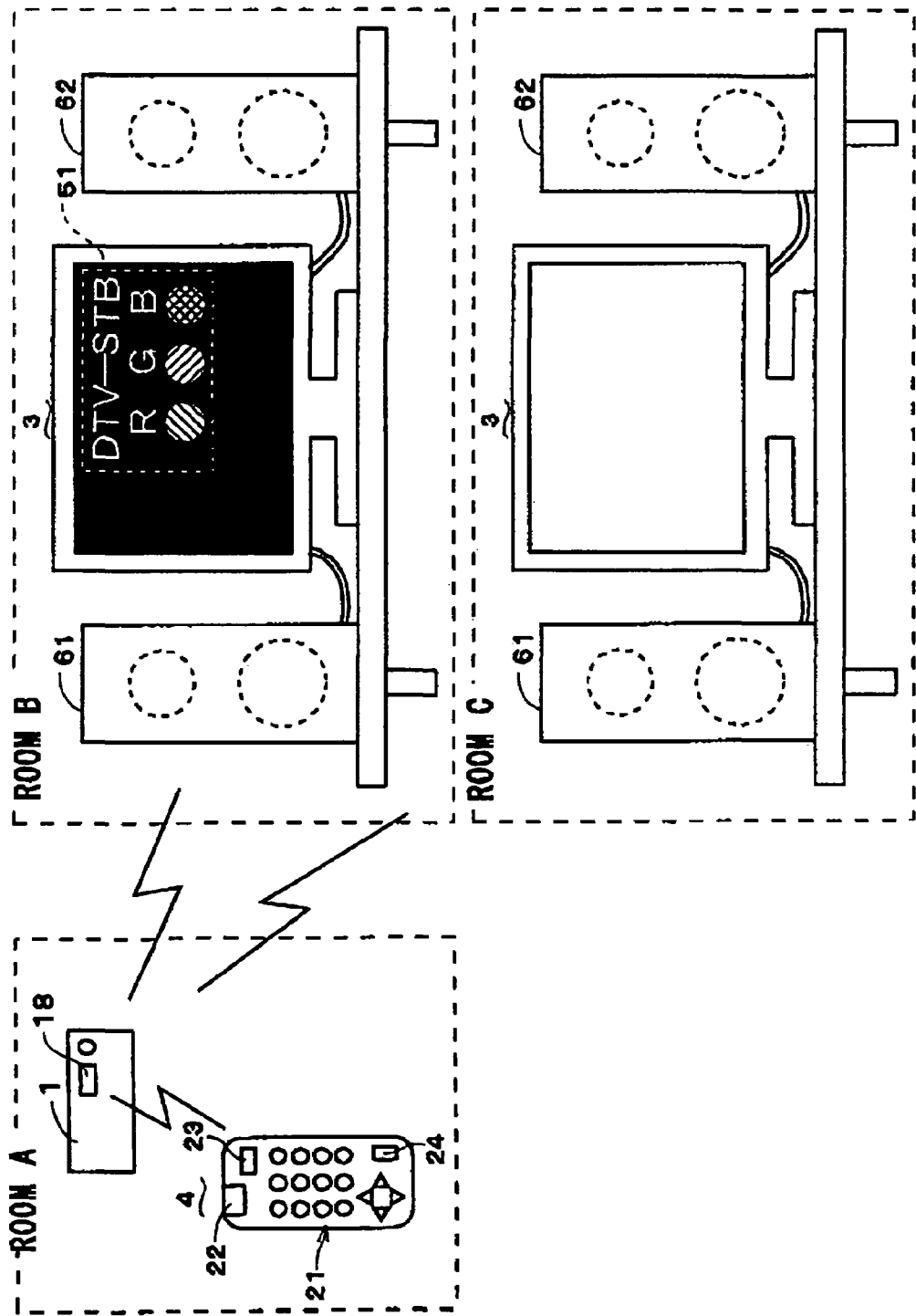

Additional effects can be obtained as described below by the above described functions that when the user presses the test key 24 of the remote control 4, the receiver 1 outputs to the monitor device 3 not only the video signals of the device information image 52 but also the audio signals both indicating the device name of the receiver 1 itself. First, as shown in FIG. 6, even assuming that the receiver 1 and a monitor device 3 are respectively placed in separate rooms, and the user is located in the room in which the receiver 1 is placed, the receiver 1 can immediately inform the user, located near the receiver 1 itself, that the receive 1 itself currently sends signals to the monitor device 3. Second, as also shown in FIG. 6, even assuming that there are multiple monitor devices 3 to which the receiver 1 can send signals, the receiver 1 can immediately inform the user, located near the receiver 1 itself, of which one of the monitor devices 3 the receiver 1 itself currently sends signals to. Note here that it is assumed that in the AV system shown in FIG. 6, video signals and audio signals are sent wirelessly from the receiver 1 in room A to the monitor devices 3 in rooms B and C.

Figure 7:
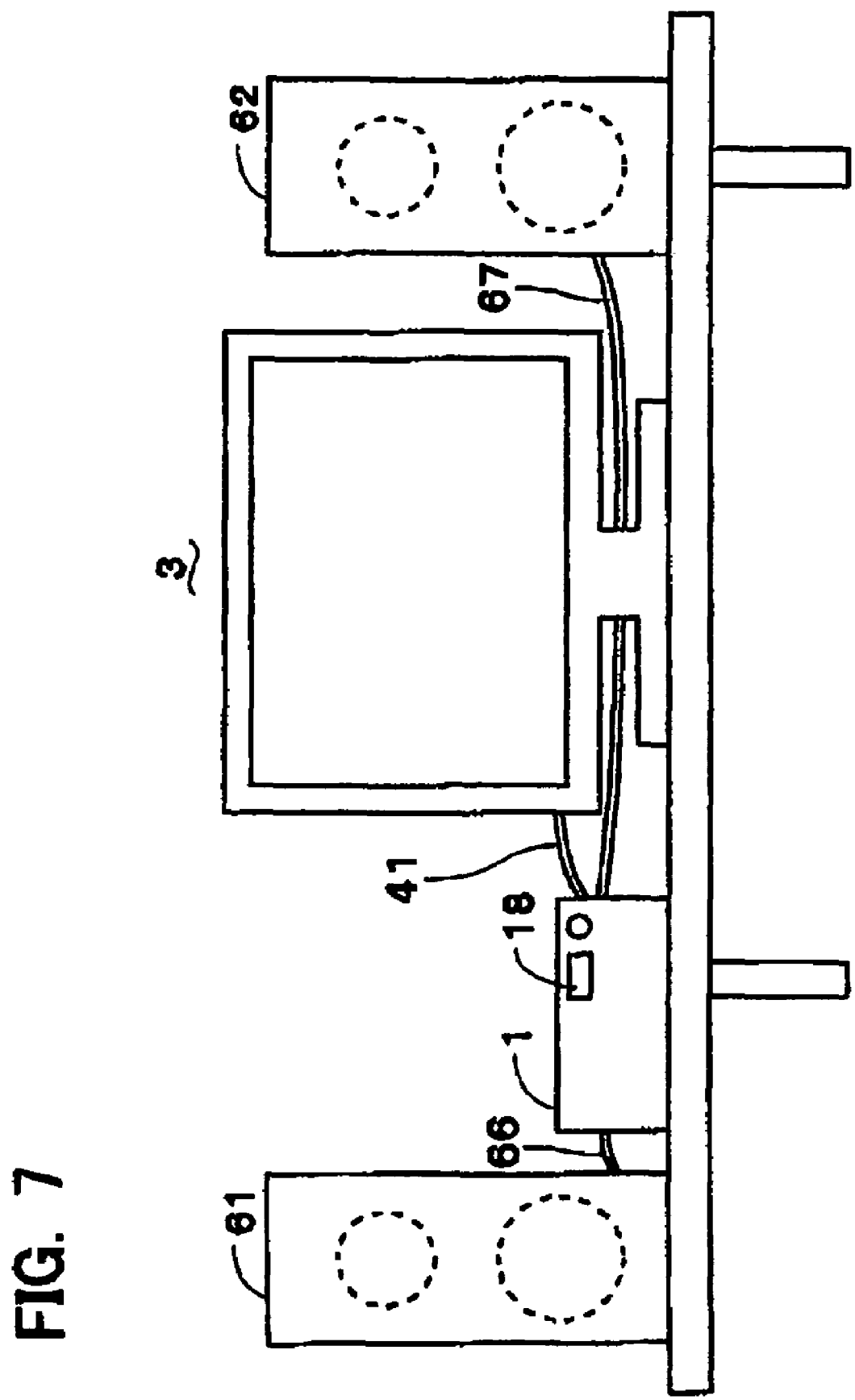
FIG. 7 is a schematic view of a video and audio signal output device according to a second embodiment of the present invention together with a monitor device and left and right speakers for explaining the operation of the second embodiment.

Hereinafter, a receiver 1 and its operation according to a second embodiment of the present invention as shown in FIG. 7 will be described. The receiver 1 according to the second embodiment mainly corresponds to each of claims 5 and 7, and basically has a configuration similar to that of the first embodiment. A left analog audio signal output terminal 34 (refer to FIG. 2, which is claimed left audio signal output terminal in each of claims 5 and 7) of the receiver 1 is connected to a speaker 61 of a monitor device 3 via a cable 66, while a right analog audio signal output terminal 35 (refer to FIG. 2, which is claimed right audio signal output terminal in each of claims 5 and 7) of the receiver 1 is connected to a speaker 62 of the monitor device 3 via a cable 67. Further, the receiver 1 has a memory 17 (refer to FIG. 1) which stores an audio signal of left notification voice to be output to the left analog audio signal output terminal 34 and also stores an audio signal of right notification voice to be output to the right analog audio signal output terminal 35. The audio sign of left notification voice and right notification voice are output to the speakers 61 and 62 as left and right notification voices, respectively, between which a user can easily identify by listening as will be described below.

If a user presses a test key 24 of a remote control 4 when the receiver 1 outputs video signals and audio signals to the monitor device 3, a microprocessor 16 of the receiver 1 outputs signals of a connection information image 51, corresponding to that described in the first embodiment, to the monitor device 3. At the same time, the microprocessor 16 of the receiver 1 outputs, to the left analog audio signal output terminal 34 and the right analog audio signal output terminal 35, the audio signal of left notification voice and the audio signal of right notification voice, respectively, which are stored in the memory 17. Here, the audio signal of left notification voice is a signal of voice saying, for example, "Left, Left, Left" or "Left terminal is connected", while the audio signal of right notification voice is a signal of voice saying, for example, "Right, Right, Right" or "Right terminal is connected". Since the audio signal of left notification voice and the audio signal of right notification voice are output to the left analog audio signal output terminal 34 and the right analog audio signal output terminal 35, respectively, a user can easily confirm or identify which of the speakers 61 and 62 has no signal input thereto, by just listening the voice without confirming or watching the actual connection to the speakers 61 and 62, in the case where no audio signal is input to the speaker 61 or the speaker 62.

It is to be noted that the present invention is not limited to the above embodiments, and various modifications are possible. For example, the first embodiment of the present invention as described above shows an example where the receiver uses a VGA terminal as a video signal output terminal. However, it is possible that the receiver uses a component signal output terminal, such as a BNC (Bayonet Neill Concelman) terminal, as the video signal output terminal.

The first embodiment furthermore shows an example where the connection information image 51 formed of the device information image 52 indicating the name or device name of the receiver itself together with the terminal connection information image 53 is used as a display image of information about the receiver itself. However, the display image of the information about the receiver itself is not limited thereto, but can be, for example, a display image indicating a type of the receiver itself. Further, assuming that multiple video and audio signal output devices having the same device name are connected to one monitor device, and that test keys in the respective multiple video and audio signal output devices are pressed, it can be designed such that the monitor device outputs different display images and/or different voices corresponding to the respective multiple video and audio signal output devices. This makes it possible for a user to easily know which one or ones of the video and audio signal output devices having the same device name currently output(s) video signals or audio signals to the monitor device.

The second embodiment shows an example where, when a user presses the test key 24 of the remote control 4, the microprocessor 16 of the receiver 1 outputs, to the monitor device 3, the video signals of the connection information image 51 together with the audio signals of left notification voice and right notification voice. However, instead, the receiver 1 can be designed such that the microprocessor 16 of the receiver 1 outputs only the audio signals of left notification voice and right notification voice.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-148575 filed May 19, 2004, the contents of which are hereby incorporated by reference.

What is claimed is:

1. A video and audio signal output device comprising:
   a decoder for decoding video signals and audio signals;
   a storage device for storing video signals of a display image of information about the video and audio signal output device itself;
   an on-screen display unit (hereafter referred to simply as "OSD unit") for superimposing the video signals of the display image of the information about the video and audio signal output device itself, stored in the storage device, on the video signals decoded by the decoder so as to form combined video signals;
   a microprocessor for controlling the video and audio signal output device in its entirety;
   an operation unit to be used by a user for giving various commands to the microprocessor;
   a video signal output terminal for outputting the video signals decoded by the decoder or outputting the combined video signals including the video signals superimposed by the OSD unit; and
   an audio signal output terminal for outputting the audio signals decoded by the decoder,
   wherein the video and audio signal output device is connected to a display device,
   wherein the video signal output terminal is a VGA (Video Graphics Array) terminal or a BNC (Bayonet Neill Concelman) terminal each having output terminals of red (R), green (G) and blue (B),
   wherein the display image of the information about the video and audio signal output device itself contains a terminal connection information image for displaying, on the display device, color images corresponding to output signals from the respective output terminals of red (R), green (G) and blue (B) in the VGA terminal or the BNC terminal, and wherein when the user commands the microprocessor, using the operation unit, to output the information about the video and audio signal output device itself to the display device, the microprocessor outputs the combined video signals, including the video signals superimposed by the OSD unit, to the display device via the video signal output terminal.

2. The video and audio signal output device according to claim 1, wherein the display image of the information about the video and audio signal output device itself further contains a device information image indicating a name of the video and audio signal output device itself.

3. The video and audio signal output device according to claim 2,
wherein the display device includes a speaker,
wherein the storage device further stores audio signals of information about the video and audio signal output device itself, and
wherein when the user commands the microprocessor, using the operation unit, to output the information about the video and audio signal output device itself to the display device, the microprocessor not only outputs the combined video signals, including the video signals superimposed by the OSD unit, to the display device via the video signal output terminal, but also outputs the audio signals of the information about the video and audio signal output device itself, stored in the storage device, to the speaker of the display device via the audio signal output terminal.

4. The video and audio signal output device according to claim 2,
wherein the display device includes a left speaker and a right speaker,
wherein the video and audio signal output device comprises a left audio signal output terminal for outputting audio signals to the left speaker of the display device, and a right audio signal output terminal for outputting audio signals to the right speaker of the display device,
wherein the storage device further stores an audio signal of left notification voice to be output to the left audio signal output terminal and an audio signal of right notification voice to be output to the right audio signal output terminal; and
wherein when the user commands the microprocessor, using the operation unit, to output the information about the video and audio signal output device itself to the display device, the microprocessor not only outputs the combined video signals, including the video signals superimposed by the OSD unit, to the display device via the video signal output terminal, but also outputs the audio signal of left notification voice, stored in the storage device, to the left speaker of the display device via the left audio signal output terminal, and further outputs the audio signal of right notification voice, stored in the storage device, to the right speaker of the display device via the right audio signal output terminal.

5. The video and audio signal output device according to claim 1,
wherein the display device includes a speaker,
wherein the storage device further stores audio signals of information about the video and audio signal output device itself, and
wherein when the user commands the microprocessor, using the operation unit, to output the information about the video and audio signal output device itself to the display device, the microprocessor not only outputs the combined video signals, including the video signals superimposed by the OSD unit, to the display device via the video signal output terminal, but also outputs the audio signals of the information about the video and audio signal output device itself, stored in the storage device, to the speaker of the display device via the audio signal output terminal.

6. The video and audio signal output device according to claim 1,
wherein the display device includes a left speaker and a right speaker,
wherein the video and audio signal output device comprises a left audio signal output terminal for outputting audio signals to the left speaker of the display device, and a right audio signal output terminal for outputting audio signals to the right speaker of the display device,
wherein the storage device further stores an audio signal of left notification voice to be output to the left audio signal output terminal and an audio signal of right notification voice to be output to the right audio signal output terminal; and
wherein when the user commands the microprocessor, using the operation unit, to output the information about the video and audio signal output device itself to the display device, the microprocessor not only outputs the combined video signals, including the video signals superimposed by the OSD unit, to the display device via the video signal output terminal, but also outputs the audio signal of left notification voice, stored in the storage device, to the left speaker of the display device via the left audio signal output terminal, and further outputs the audio signal of right notification voice, stored in the storage device, to the right speaker of the display device via the right audio signal output terminal.

* * * * *